United States Patent
Yuan et al.

(10) Patent No.: US 8,456,964 B1
(45) Date of Patent: Jun. 4, 2013

(54) ENERGY ASSISTED MAGNETIC RECORDING HEAD HAVING A REFLECTOR FOR IMPROVING EFFICIENCY OF THE LIGHT BEAM

(75) Inventors: Hongxing Yuan, San Ramon, CA (US); Shing Lee, Fremont, CA (US); Zhong Shi, Dublin, CA (US); Jinshan Li, San Jose, CA (US); Ut Tran, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 225 days.

(21) Appl. No.: 12/947,085

(22) Filed: Nov. 16, 2010

(51) Int. Cl.
*G11B 11/00* (2006.01)

(52) U.S. Cl.
USPC ..................... 369/13.33; 369/13.13

(58) Field of Classification Search
USPC .......... 369/13.13, 13.33, 13.32, 13.02, 13.17,
369/112.09, 112.14, 112.21, 112.27, 300;
360/59; 385/129, 31, 88–94; 29/603.07–603.27;
250/201.3, 201.5
See application file for complete search history.

(56) References Cited

U.S. PATENT DOCUMENTS

| | | | |
|---|---|---|---|
| 4,743,083 A | 5/1988 | Schimpe | |
| 5,625,729 A | 4/1997 | Brown | |
| 6,275,453 B1 | 8/2001 | Ueyanagi et al. | |
| 6,671,127 B2 | 12/2003 | Hsu et al. | |
| 6,687,195 B2 | 2/2004 | Miyanishi et al. | |
| 6,795,630 B2 | 9/2004 | Challener et al. | |
| 6,834,027 B1 | 12/2004 | Sakaguchi et al. | |
| 6,975,580 B2 | 12/2005 | Rettner et al. | |
| 7,027,700 B2 | 4/2006 | Challener | |
| 7,042,810 B2 | 5/2006 | Akiyama et al. | |
| 7,171,080 B2 | 1/2007 | Rausch | |
| 7,190,539 B1 | 3/2007 | Nibarger | |
| 7,266,268 B2 | 9/2007 | Challener et al. | |
| 7,272,079 B2 | 9/2007 | Challener | |
| 7,330,404 B2 | 2/2008 | Peng et al. | |
| 7,440,660 B1 | 10/2008 | Jin et al. | |
| 7,500,255 B2 | 3/2009 | Seigler et al. | |
| 7,567,387 B2 | 7/2009 | Itagi et al. | |
| 7,580,602 B2 | 8/2009 | Itagi et al. | |
| 7,596,072 B2 | 9/2009 | Buechel et al. | |
| 7,649,677 B2 | 1/2010 | Jin et al. | |
| 7,839,497 B1 | 11/2010 | Rausch et al. | |
| 8,116,171 B1 * | 2/2012 | Lee ............................ | 369/13.33 |
| 8,125,856 B1 * | 2/2012 | Li et al. ..................... | 369/13.33 |

(Continued)

FOREIGN PATENT DOCUMENTS

| EP | 1501076 A1 | 1/2005 |
|---|---|---|
| EP | 1498878 B1 | 4/2008 |

*Primary Examiner* — Tan X Dinh

(57) ABSTRACT

A method and system for providing an EAMR transducer is described. The EAMR transducer is coupled with a laser for providing energy and has an ABS that resides near a media during use. The EAMR transducer includes a write pole, coil(s) that energize the pole, a near field transducer (NFT) proximate to the ABS, a waveguide, and a reflector. The write pole has a back gap region and writes to a region of the media. The NFT focuses the energy onto the media. The waveguide directs the energy from the laser toward the NFT at an incident angle with respect to the ABS. A first portion of the energy reflects off of the ABS at a reflected angle. The reflector receives the first portion of the energy from the ABS and reflects a second portion of the energy toward the ABS. The NFT resides between the waveguide and the reflector.

24 Claims, 4 Drawing Sheets

U.S. PATENT DOCUMENTS

| | | |
|---|---|---|
| 2001/0006435 A1 | 7/2001 | Ichihara et al. |
| 2001/0017820 A1 | 8/2001 | Akiyama et al. |
| 2003/0184903 A1 | 10/2003 | Challener |
| 2003/0198146 A1 | 10/2003 | Rottmayer et al. |
| 2004/0001420 A1 | 1/2004 | Challener |
| 2004/0027728 A1 | 2/2004 | Coffey et al. |
| 2004/0223249 A1 | 11/2004 | Kang et al. |
| 2004/0228022 A1 | 11/2004 | Ueyanagi |
| 2005/0047013 A1 | 3/2005 | Le et al. |
| 2005/0289576 A1 | 12/2005 | Challener |
| 2007/0081426 A1 | 4/2007 | Lee et al. |
| 2007/0081427 A1 | 4/2007 | Suh et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0232225 A1 | 9/2008 | Cho et al. |
| 2011/0228651 A1* | 9/2011 | Gage et al. ............ 369/13.33 |
| 2011/0228652 A1* | 9/2011 | Gage et al. ............ 369/13.33 |
| 2012/0113770 A1* | 5/2012 | Stipe ..................... 369/13.33 |

* cited by examiner

Top View  Side View

ENERGY ASSISTED MAGNETIC RECORDING HEAD HAVING A REFLECTOR FOR IMPROVING EFFICIENCY OF THE LIGHT BEAM

BACKGROUND

FIG. 1 depicts a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12, coil connection 18, a conventional grating 20, a conventional near-field transducer (NFT) 22, and a conventional pole 30. Light from a laser (not shown) is incident on the grating 20, which coupled light to the waveguide 12. Light is guided by the conventional waveguide 12 to the NFT 22 near the air-bearing surface (ABS). In the embodiment shown, the conventional waveguide 12 is a parabolic solid immersion mirror. The NFT 22 focuses the light to magnetic recording media (not shown), such as a disk. The coil connection 18 provides a mechanism for electrically coupling the coils to a current source (not shown). The portion of the pole 30 shown corresponds to the back gap of the pole 30.

In operation, light from the laser is coupled to the conventional EAMR transducer 10 using the grating 20. The waveguide 12 directs light from the grating 12 to the NFT 22. The NFT 22 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. For certain types of NFTs 22, a longitudinal polarization is desired. Generally, this polarization is achieved by combining a half-pitch shifted grating for the grating 20 with parabolic solid immersion mirror for the waveguide 12. However, the back gap of the pole 30 and coil connection 18 block a portion of the light from the waveguide 12. In particular, dashed lines 14 and 16 in FIG. 1 indicate the region in which light coupled in by the grating 20 is blocked. Consequently, this portion of the light is not coupled into the NFT 22. This portion of the light is also generally the most intense. As a result, the NFT 22 cannot make use of the most intense portion of the light from the laser. Efficiency of the NFT 22, and thus the EAMR transducer 10, is adversely affected.

Accordingly, what is needed is a system and method for improving efficiency and performance of an NFT.

BRIEF SUMMARY OF THE INVENTION

A method and system for providing an EAMR transducer is described. The EAMR is coupled with a laser for providing energy and has an ABS configured to reside in proximity to a media during use. The EAMR transducer includes a write pole, at least one coil, an NFT, a waveguide, and reflector. The write pole has a back gap region and is configured to write to a region of the media. The coil(s) energize the write pole. The NFT is proximate to the ABS and focuses the energy onto the region of the media. The waveguide is configured to direct the energy from the laser toward the NFT at an incident angle with respect to the ABS. A first portion of the energy reflects off of the ABS at a reflected angle. The reflector is configured to receive the first portion of the energy at the reflected angle from the ABS and to reflect a second portion of the energy toward the ABS. The NFT resides between the waveguide and the reflector.

DETAILED DESCRIPTION OF THE EMBODIMENTS OF THE INVENTION

Figure 1:
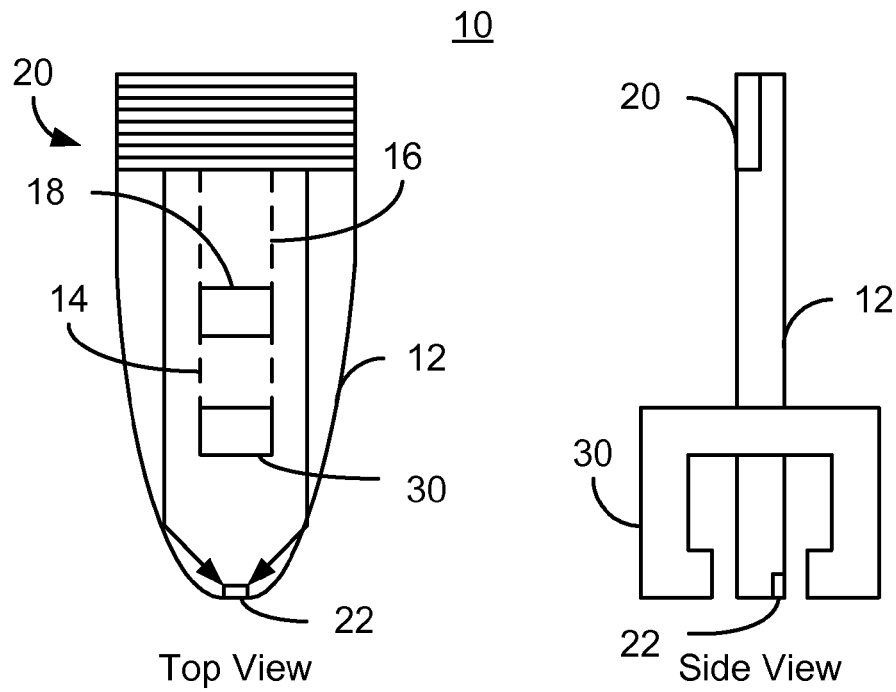
FIG. 1 is a diagram depicting a conventional EAMR transducer.
Figure 2:
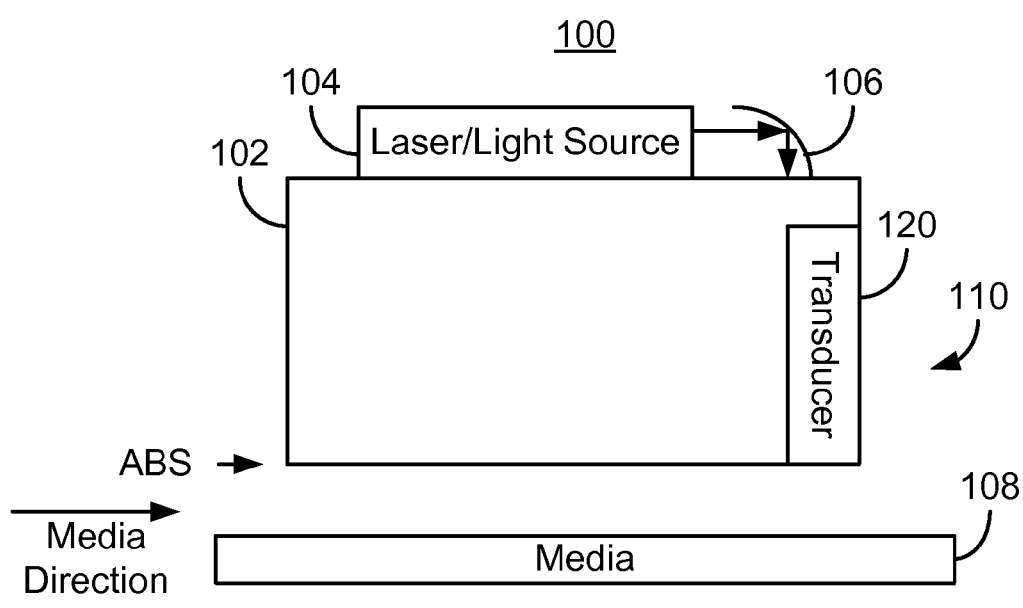
FIG. 2 is a diagram depicting an exemplary embodiment of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes a slider 102, a laser/light source 104, a mirror or other optics 106 for redirecting light from the laser 104, media 108, and an EAMR head 110. In some embodiments, the laser 104 is a laser diode. Although shown as mounted on the slider 102, the laser 104 may be coupled with the slider 102 in another fashion. For example, the laser 104 might be mounted on a suspension (not shown in FIG. 2) to which the slider 102 is also attached. The laser 104 may also be oriented differently and/or optically coupled with the EAMR transducer 120 in another manner. The media 108 may include multiple layers, which are not shown in FIG. 2 for simplicity.

The EAMR head 110 includes an EAMR transducer 120. The EAMR head 110 may also include a read transducer (not shown in FIG. 2). The read transducer may be included if the EAMR head 110 is a merged head. The EAMR transducer 120 includes optical components (not shown in FIG. 2) as well as magnetic components (not shown in FIG. 2).

Figure 3:
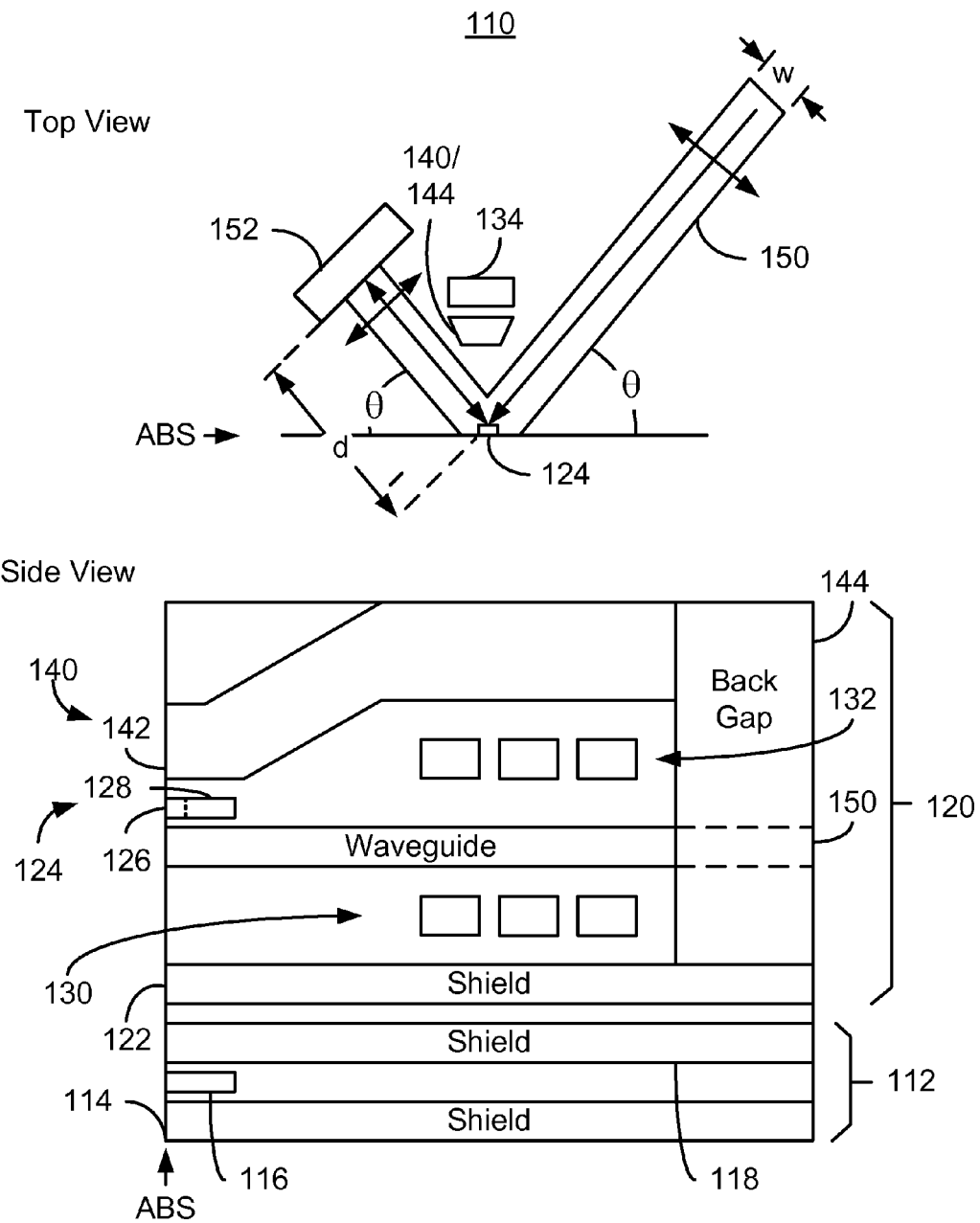
FIG. 3 is a diagram depicting to and side views of an exemplary embodiment of an EAMR transducer.

FIG. 3 is a diagram depicting another exemplary embodiment of the EAMR head 110 shown in FIG. 2. Consequently, analogous components are labeled similarly. For simplicity, FIG. 3 is not to scale. In addition, portions of the EAMR transducer 120 may be omitted in FIG. 3. For example a grating that may be used to couple light from the laser 104 into the EAMR transducer 120 is not shown in FIG. 3. In addition to the EAMR transducer 120, optional read transducer 122 is also shown. The read transducer 112 includes shields 114 and 118 as well as read sensor 116. In other embodiments, the read transducer 112 may be omitted.

The EAMR transducer 120 shown includes a shield 122, NFT 124, coils 130 and 132 having connection 134, pole 140, and waveguide 150. The coils 130 and 132 shown are pancake coils having the connection 134. In other embodiments, for example if helical coils are used, the connection 134 may be omitted and/or the positions of the coils may be changed. The NFT 124 may include a disk portion 126 and a pin portion 128. However, in another embodiment, another type of NFT 124 may be used. The NFT 124 is in proximity to the ABS and is used to focus light from the laser 104 onto the media 108.

The pole 140 includes pole tip 142 and back gap region 144. In other embodiments, the pole 140 may have different and/or additional components. When energized by the coil(s) 130 and 132, the pole 140 writes to a region of the media 108.

The EAMR transducer 120 also includes optics 150 and 152. In particular, a waveguide 150 and optional reflector 152 are used. The waveguide 150 directs the energy from the laser 104 toward the ABS at an incident angle, θ. At least a portion of the energy directed by the waveguide 150 reflects off of the ABS, away from the media (not shown in FIG. 3) and toward the reflector 152. The NFT 124 resides between the incident portion of the waveguide 150 and the reflector 152. Although reflector 152 is shown, in other embodiments, the reflector 152 may be omitted. However, in such embodiments, less control over the polarization may be achieved and lower efficiently may be obtained As can be seen in FIG. 3, the waveguide 150 directs the energy at an incident angle, θ, from the ABS. The incident angle θ may be an acute angle. The incident angle is such that the waveguide 150 directs the energy from the laser 104 around the pole 140, particularly around the back gap 144 and connection 134 to the coils. However, some space may be desired to be reserved between the back gap 144 and the waveguide 150 to reduce the absorption. There is, therefore, a maximum desired incident angle that is somewhat less than one that would bring the waveguide 150 into contact with the back gap 144. The incident angle is also desired to be sufficiently large that energy leaked into the air gap at the ABS is not larger than desired. The incident angle is, therefore, greater than zero. In general, the incident angle is desired to be as large as possible to reduce leakage through the ABS, while achieving total internal reflection as described below.

In some embodiments, the energy from the laser 104 is desired to undergo total internal reflection at the ABS. To undergo total internal reflection, the incident angle, θ, is the critical angle for the light energy. The critical angle is the incident angle such that the energy undergoes total internal reflection. In such an embodiment, substantially all of the energy from the laser is transferred to the reflector 152. However, in practice, the incident angle, θ, of the waveguide 150 is not greater than the critical angle. In some embodiments, the critical angle is at least fifty six degrees and not more than seventy-one degrees. However, in other embodiments in which the waveguides have different indices of refraction, the critical angles may be different. Thus, in some embodiments the incident angle is at least twenty degrees and not more than sixty-five degrees. In some such embodiments, the incident angle is at least thirty and not more than fifty degrees. The portion of the waveguide 150 between the NFT 124 and the reflector 152 is generally desired to be symmetric with the portion of the waveguide 150 to the right of the NFT 124. However in other embodiments, the portions of the waveguide 150 need not be symmetric.

In addition to directing energy from the laser 104 toward the ABS such that the energy does not intersect the back gap 144, the waveguide may be narrow in width. In some embodiments, the waveguide 150 has a width, w, substantially perpendicular to a direction of travel of the energy of at least three hundred and not more than six hundred nanometers. In some such embodiments, the width is not more than four hundred nanometers. The width of the waveguide 150 may thus be selected to be able to achieve single lateral mode for energy propagation. However, in other embodiments, other modes may be supported.

The optional reflector 152 receives the reflected energy at a reflected angle. In the embodiment shown, the reflected angle is the same as the incident angle. The reflector 152 may be a grating and/or a mirror. The reflector 152 reflects energy back toward the ABS, as shown in FIG. 3. In some embodiments, the angle of incidence for the reflected energy is the same as the reflected angle. However, in other embodiments, the angle of incidence for the reflected energy is different from the reflected angle. Because the reflector 152 is used, light may be recycled to the NFT 124.

The EAMR transducer 120 may have improved efficiency. In particular, energy from the laser 104 is not lost to the back gap 144. Instead, the waveguide 150 directs the energy from the laser 104 around the back gap 144. Consequently, more of the energy from the laser 104 may be coupled into the NFT 124. Thus, optical efficiency of the NFT 124 is improved. Further, as discussed below, the desired polarization may be obtained using the waveguide 150 and reflector 152.

Figure 4:
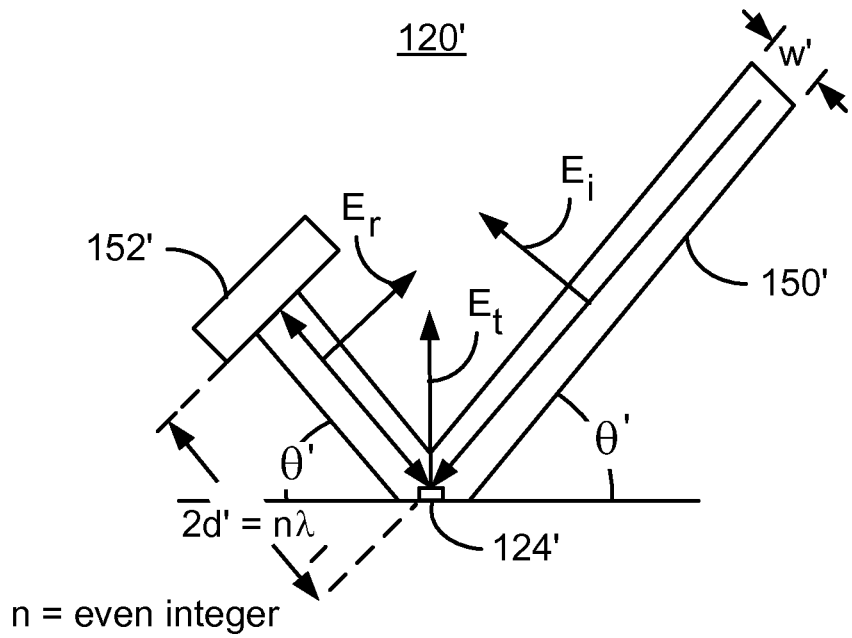
FIG. 4 is a diagram depicting an exemplary embodiment of the electric field at the NFT for a particular path difference.
Figure 5:
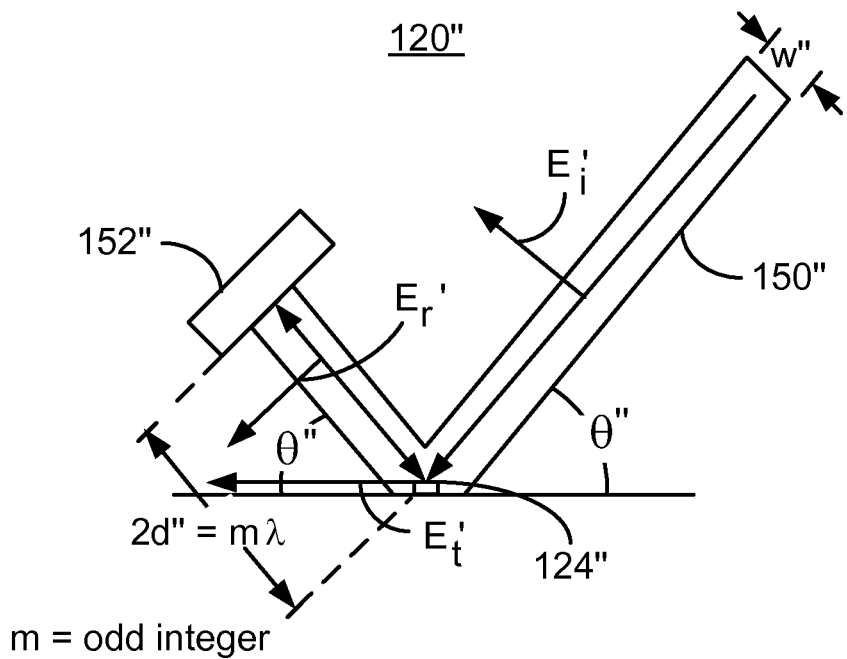
FIG. 5 is a diagram depicting an exemplary embodiment of the electric field at the NFT for a particular path difference.

FIGS. 4-5 depict embodiments of the EAMR transducer 120' and 120" in which the energy at the NFT 124'/124" has the desired polarization. The waveguides 150' and 150" and reflectors 152' and 152" are analogous to the waveguide 150 and reflector 152. Consequently, the components are labeled similarly. In the embodiment shown in FIG. 4, the distance, d', between the reflector 152' and the NFT 124' is such that the path difference between the incident energy and energy reflected by the reflector 152' (2d') is an even integer, n, multiplied by the effective wavelength. The reflected light also undergoes a phase change upon reflection at the reflector 152". As a result, the phase difference between the reflected light at the NFT 124' and the incident light at the NFT 124' is an odd integer multiplied by π. This configuration results in a longitudinal polarization. For example, as shown in FIG. 4, the reflected light has electric field $E_r$, while the incident light has electric field $E_i$. As can be seen in FIG. 4, the components of the electric fields in the plane of the ABS cancel. Consequently, the total electric field for at the NFT 124' is $E_t$.

Conversely, FIG. 5 depicts an embodiment in which the distance, d", between the reflector 152" and the NFT 124" is such that the path difference between the incident energy and the energy reflected by the reflector 152" (2d") is an odd integer, m, multiplied by the effective wavelength. Taking into account a phase change occurring when the energy reflects off of the reflector 152, the phase difference between the reflected light and the incident light at the NFT 124" is an even integer multiplied by π. This configuration results in a lateral polarization. For example, as shown in FIG. 5, the reflected light has electric field $E_r'$, while the incident light has electric field $E_i'$. As can be seen in FIG. 4, the components of the electric fields perpendicular to the plane of the ABS cancel. Consequently, the total electric field for at the NFT 124" is $E_t'$. Note that if the path difference is different, the phase difference may not be an integer multiplied by π. In such embodiments the phase difference results in other orientations of the total electric field. Thus, in addition to improving the efficiency of the NFT 124/124'/124", the desired polarization for the NFT 124/124'/124" may be achieved. Thus, using the EAMR transducer 120/120'/120", optical efficiency may be improved and flexibility enhanced.

Figure 6:
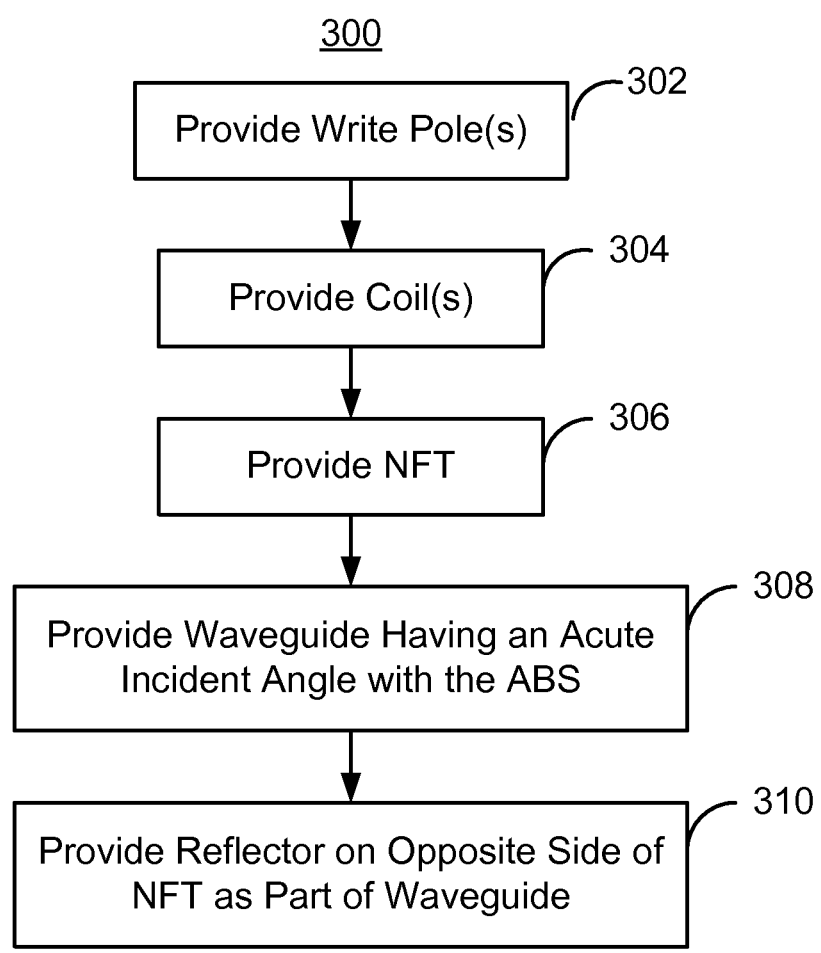
FIG. 6 is a flow chart depicting an exemplary embodiment of a method for fabricating an EAMR transducer.

FIG. 6 depicts an exemplary embodiment of a method 200 of forming a portion of an EAMR head. For simplicity, some steps may be omitted, combined, and/or performed in another sequence. The method 200 is described in the context of the EAMR disk drive 100 and EAMR head 110. However, the method 200 may be used to fabricate other EAMR heads. In addition, the method 200 is described in the context of fabricating a single disk drive 100. However, multiple transducers may be fabricated substantially in parallel. Further, although described as separate steps, portions of the method 200 may be interleaved.

The write pole 140 and its constituents are provided, via step 302. The coil(s) for energizing the pole 130 are also provided in step 304. The NFT is also fabricated, via step 306. The waveguide 150/150'/150" is provided, via step 308. Finally, the reflector 152/152'/152" is formed opposite to the waveguide 150'/150", via step 310.

Using the method 200, the EAMR heads 110, 110', and/or 110" may be obtained. Consequently, the benefits of such devices may be achieved.

We claim:

1. An energy assisted magnetic recording (EAMR) transducer coupled with a laser for providing energy and having an air-bearing surface (ABS) configured to reside in proximity to a media during use, the EAMR transducer comprising:
    a write pole having a back gap region and configured to write to a region of the media;
    at least one coil for energizing the write pole;
    a near field transducer (NFT) proximate to the ABS and for focusing the energy onto the region of the media;
    a waveguide configured to direct the energy from the laser toward the NFT at an incident angle with respect to the ABS, a portion of the waveguide having a central axis at the incident angle with respect to the ABS, the central axis being substantially along a transmission direction of the energy a first portion of the energy reflecting off of the ABS at a reflected angle; and
    a reflector configured to receive the first portion of the energy at the reflected angle from the ABS and to reflect a second portion of the energy toward the ABS, the NFT residing between at least a portion of the waveguide and the reflector.

2. The EAMR transducer of claim 1 wherein the incident angle is an acute angle.

3. The EAMR transducer of claim 2 wherein the incident angle is configured such that the energy does not intersect the back gap.

4. The EAMR transducer of claim 2 wherein the incident angle is not more than a critical angle, the critical angle being such that the energy undergoes total internal reflection at the ABS.

5. The EAMR transducer of claim 4 wherein the critical angle is at least fifty-six degrees and not more than seventy-one degrees.

6. The EAMR transducer of claim 4 wherein the incident angle is at least twenty degrees and not more than sixty-five degrees.

7. The EAMR transducer of claim 6 wherein the incident angle is at least thirty and not more than fifty degrees.

8. The EAMR transducer of claim 1 wherein the incident angle is substantially the same as the reflected angle.

9. The EAMR transducer of claim 1 wherein the waveguide has a width substantially perpendicular to a direction of travel of the energy, the width being at least three hundred and not more than six hundred nanometers.

10. The EAMR transducer of claim 1 wherein the reflector includes at least one of a mirror and a grating.

11. The EAMR transducer of claim 1 wherein the waveguide and the reflector are configured such that the energy has a longitudinal polarization at the NFT.

12. The EAMR transducer of claim 1 An energy assisted magnetic recording (EAMR) transducer coupled with a laser for providing energy and having an air-bearing surface (ABS) configured to reside in proximity to a media during use, the EAMR transducer comprising:
    a write pole having a back gap region and configured to write to a region of the media;
    at least one coil for energizing the write pole;
    a near field transducer (NFT) proximate to the ABS and for focusing the energy onto the region of the media;
    a waveguide configured to direct the energy from the laser toward the NFT at an incident angle with respect to the ABS, a first portion of the energy reflecting off of the ABS at a reflected angle; and
    a reflector configured to receive the first portion of the energy at the reflected angle from the ABS and to reflect a second portion of the energy toward the ABS, the NFT residing between at least a portion of the waveguide and the reflector;
    wherein the waveguide and the reflector are configured such that the energy incident at the NFT and the second portion of the energy have a phase difference that is an odd number multiplied by $\pi$.

13. An energy assisted magnetic recording (EAMR) transducer coupled with a laser for providing energy and having an air-bearing surface (ABS) configured to reside in proximity to a media during use, the EAMR transducer comprising:
    a write pole having a back gap region and configured to write to a region of the media;
    at least one coil for energizing the write pole;
    a near field transducer (NFT) proximate to the ABS and for focusing the energy onto the region of the media;
    a waveguide configured to direct the energy from the laser toward the NFT at an incident angle with respect to the ABS, a first portion of the energy reflecting off of the ABS at a reflected angle, the incident angle being not more than a critical angle, the critical angle being such that the energy undergoes total internal reflection at the ABS, the critical angle being at least fifty-six degrees and not more than seventy-one degrees, the waveguide having a width substantially perpendicular to a direction of travel of the energy, the width being at least three hundred and not more than six hundred nanometers; and
    a reflector configured to receive the first portion of the energy at the reflected angle from the ABS and to reflect a second portion of the energy toward the ABS, the NFT residing between the waveguide and the reflector, the reflector being at least one of a mirror and a grating, the waveguide and the reflector being configured such that the energy incident at the NFT and the second portion of the energy have a phase difference that is an odd number multiplied by $\pi$.

14. An energy assisted magnetic recording (EAMR) transducer coupled with a laser for providing energy and having an air-bearing surface (ABS) configured to reside in proximity to a media during use, the EAMR transducer comprising:
    a write pole having a back gap region and configured to write to a region of the media;
    at least one coil for energizing the write pole;
    a near field transducer (NFT) proximate to the ABS and for focusing the energy onto the region of the media;
    a waveguide for receiving a portion of the energy and configured to direct the portion of the energy from the laser toward the NFT at an incident angle with respect to the ABS and such that no portion of the energy is incident on the back gap, a portion of the waveguide having a central axis at the incident angle with respect to the ABS, the central axis being substantially along a transmission direction of the energy.

15. An energy assisted magnetic recording (EAMR) disk drive comprising:
    a media for storing data;
    a slider having an air-bearing surface (ABS) configured to reside in proximity to the media during use;
    a laser coupled with the slider for providing energy;

an EAMR transducer coupled with the slider and including a write pole, at least one coil, a near field transducer (NFT), a waveguide, and a reflector, the write pole having a back gap region and configured to write to a region of the media, the at least one coil for energizing the write pole, the NFT residing proximate to the ABS and for focusing the energy onto the region of the media, the waveguide configured to direct the energy from the laser toward the NFT at an incident angle with respect to the ABS, a portion of the waveguide having a central axis at the incident angle with respect to the ABS, the central axis being substantially along a transmission direction of the energy, a first portion of the energy reflecting off of the ABS at a reflected angle, the reflector configured to receive the first portion of the energy at the reflected angle from the ABS and to reflect a second portion of the energy toward the ABS, the NFT residing between the waveguide and the reflector.

16. The EAMR disk drive of claim 15 wherein the incident angle is configured such that the energy does not intersect the back gap.

17. The EAMR disk drive of claim 15 wherein the incident angle is not more than the a critical angle, the critical angle being such that the energy undergoes total internal reflection at the ABS.

18. The EAMR disk drive of claim 17 wherein the critical angle is at least fifty-six degrees and not more than seventy-one degrees.

19. The EAMR disk drive of claim 17 wherein the incident angle is at least thirty and not more than fifty degrees.

20. The EAMR disk drive of claim 15 wherein the incident angle is substantially the same as the reflected angle.

21. The EAMR disk drive of claim 15 wherein the waveguide has a width substantially perpendicular to a direction of travel of the energy, the width being at least three hundred and not more than six hundred nanometers.

22. The EAMR disk drive of claim 15 wherein the reflector includes at least one of a mirror and a grating.

23. The EAMR disk drive of claim 15 wherein the waveguide is configured such that the energy has a longitudinal polarization at the NFT.

24. The EAMR disk drive of claim 15 An energy assisted magnetic recording (EAMR) disk drive comprising:
   a media for storing data;
   a slider having an air-bearing surface (ABS) configured to reside in proximity to the media during use;
   a laser coupled with the slider for providing energy;
   an EAMR transducer coupled with the slider and including a write pole, at least one coil, a near field transducer (NFT), a waveguide, and a reflector, the write pole having a back gap region and configured to write to a region of the media, the at least one coil for energizing the write pole, the NFT residing proximate to the ABS and for focusing the energy onto the region of the media, the waveguide configured to direct the energy from the laser toward the NFT at an incident angle with respect to the ABS, a first portion of the energy reflecting off of the ABS at a reflected angle, the reflector configured to receive the first portion of the energy at the reflected angle from the ABS and to reflect a second portion of the energy toward the ABS, the NFT residing between the waveguide and the reflector;
   wherein the waveguide and the reflector are configured such that the energy incident at the NFT and the second portion of the energy have a phase difference that is an odd number multiplied by $\pi$.

\* \* \* \* \*